(12) United States Patent
Yoo et al.

(10) Patent No.: US 9,774,031 B2
(45) Date of Patent: Sep. 26, 2017

(54) NEGATIVE ELECTRODE COMPOSITION, AND NEGATIVE ELECTRODE AND LITHIUM BATTERY CONTAINING THE SAME

(71) Applicant: SAMSUNG SDI CO., LTD., Yongin-si, Gyeonggi-do (KR)

(72) Inventors: Ha-Na Yoo, Yongin-si (KR); Man-Seok Han, Yongin-si (KR); Myung-Hoon Kim, Yongin-si (KR); Seung-Wan Kim, Yongin-si (KR); Jung-Yeon Won, Yongin-si (KR); So-Ra Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 88 days.

(21) Appl. No.: 14/619,433

(22) Filed: Feb. 11, 2015

(65) Prior Publication Data

US 2015/0303456 A1 Oct. 22, 2015

(30) Foreign Application Priority Data

Apr. 18, 2014 (KR) ........................ 10-2014-0046932

(51) Int. Cl.
*H01M 4/36* (2006.01)
*H01M 10/0525* (2010.01)
*H01M 4/62* (2006.01)
*H01M 4/133* (2010.01)
*H01M 4/134* (2010.01)
*H01M 4/587* (2010.01)
*H01M 4/38* (2006.01)
*H01M 4/40* (2006.01)

(52) U.S. Cl.
CPC ........... *H01M 4/364* (2013.01); *H01M 4/133* (2013.01); *H01M 4/134* (2013.01); *H01M 4/366* (2013.01); *H01M 4/38* (2013.01); *H01M 4/386* (2013.01); *H01M 4/387* (2013.01); *H01M 4/40* (2013.01); *H01M 4/587* (2013.01); *H01M 4/622* (2013.01); *H01M 4/625* (2013.01); *H01M 10/0525* (2013.01)

(58) Field of Classification Search
CPC ........... H01M 2004/027; H01M 4/133; H01M 4/134; H01M 4/364; H01M 4/366; H01M 4/386; H01M 4/387; H01M 4/622; H01M 4/42; H01M 4/38; H01M 4/40; H01M 4/625; H01M 10/0525
See application file for complete search history.

(56) References Cited

U.S. PATENT DOCUMENTS

| | | | |
|---|---|---|---|
| 2001/0049872 A1* | 12/2001 | Hong | H01M 2/1686 29/623.3 |
| 2002/0090541 A1 | 7/2002 | Hobson et al. | |
| 2008/0187838 A1 | 8/2008 | Le | |
| 2008/0233479 A1* | 9/2008 | Sung | H01M 4/134 429/220 |
| 2009/0061325 A1 | 3/2009 | Odani et al. | |
| 2012/0225371 A1 | 9/2012 | Kim et al. | |
| 2013/0253163 A1* | 9/2013 | Liu | C07D 221/00 528/220 |

FOREIGN PATENT DOCUMENTS

| | | |
|---|---|---|
| JP | 3670565 B2 | 4/2005 |
| KR | 10-2009-0023287 A | 3/2009 |
| KR | 10-2009-0109570 A | 10/2009 |
| WO | WO 2012/000041 A1 | 1/2012 |

* cited by examiner

*Primary Examiner* — Anca Eoff
(74) *Attorney, Agent, or Firm* — Lee & Morse, P.C.

(57) ABSTRACT

Provided are a composition for a negative electrode, and a negative electrode and lithium battery including the composition. The composition includes a negative active material that contains one or more of a metal or a metalloid, an acrylate-based binder, and a guanidine carbonate.

16 Claims, 6 Drawing Sheets

NEGATIVE ELECTRODE COMPOSITION, AND NEGATIVE ELECTRODE AND LITHIUM BATTERY CONTAINING THE SAME

CROSS-REFERENCE TO RELATED APPLICATION

Korean Patent Application No. 10-2014-0046932, filed on Apr. 18, 2014, in the Korean Intellectual Property Office, and entitled: "Negative Electrode Composition, And Negative Electrode And Lithium Battery Containing The Same," is incorporated by reference herein in its entirety.

BACKGROUND

1. Field

One or more embodiments relate to a negative electrode composition and a negative electrode and lithium battery including the negative electrode composition.

2. Description of the Related Art

Lithium batteries may have high voltage and high energy density, and may be used in various applications. For example, electric vehicles (e.g., hybrid electric vehicles (HEV) or plug-in hybrid electric vehicles (PHEV)) may operate at high temperature, may be charged or discharged with a large amount of electricity, and may used for a long period of time. Accordingly, they may use lithium batteries, which should provide excellent discharge capacity and lifespan properties.

SUMMARY

Embodiments may be realized by providing a composition for a negative electrode, the composition including a negative active material that contains one or more of a metal or a metalloid, an acrylate-based binder, and guanidine carbonate.

The guanidine carbonate may be present in an amount of about 3 parts by weight or more based on 100 parts by weight of the acrylate-based binder.

The guanidine carbonate may be present in an amount of about 3 to about 30 parts by weight based on 100 parts by weight of the acrylate-based binder.

The acrylate-based binder may include lithium polyacrylate.

The lithium polyacrylate may be a lithium salt of polyacrylic acid that includes an ethylenically unsaturated carboxylic acid as a monomer repeating unit, and the ethylenically unsaturated carboxylic acid may be an acrylic acid, a methacrylic acid, an itaconic acid, a fumaric acid, a chrotonic acid, a maleic acid, a maleic anhydride, a mesaconic acid, a glutaconic acid, a derivative thereof, or a combination thereof.

The acrylate-based binder may be present in an amount of about 2 to about 10 wt % based on a total weight of the composition.

The acrylate-based binder may be present in an amount of about 4 to about 8 wt % based on a total weight of the composition.

The negative active material may include at least one metal or metalloid element selected from a Group 13 element, a Group 14 element, and a Group 15 element.

The negative active material may include at least one metal or metalloid element selected from Si, Ge, and Sn.

The negative active material may include a Si—Z alloy, wherein Z is an alkali metal, an alkali earth-metal, a Group 11 element, a Group 12 element, a Group 13 element, a Group 14 element, a Group 15 element, a Group 16 element, a transition metal, a rare-earth element, or a combination thereof, with the proviso that Z is not Si.

The Z may be selected from Ca, Sc, Ti, V, Cr, Mn, Fe, Co, Ni, Cu, Zn, Sr, Y, Zr, Nb, Ba, Lu, Hf, Ta, a lanthanum element, or a combination thereof.

The Si—Z alloy may be represented by Si-M'-M", wherein M' is Al, Ti, or Fe, and M" is Ni, Fe, or Mn.

The negative active material may be in at least one form selected from a nanoparticle, a nanowire, a nanotube, a nanobelt, a nanorod, a nano porous structure and a nanotemplate.

The negative active material may be in a form of a nanoparticle.

The composition may further include a carbonaceous negative active material.

The carbonaceous negative active material may be blended with the negative active material by mixing, or the carbonaceous negative active material may be coated on a surface of the negative active material.

Embodiments may be realized by providing a negative electrode, including the presently disclosed composition.

Embodiments may be realized by providing a lithium battery, including the negative electrode that includes the presently disclosed composition.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer is referred to as being "between" two layers, it can be the only layer between the two layers, or one or more intervening layers may also be present.

A negative active material according to an embodiment includes a metal/metalloid-containing negative active material, an acrylate-based binder, and guanidine carbonate.

The metal/metalloid-containing negative active material may include at least one element selected from a Group 13 element, a Group 14 element, and a Group 15 element shown in the periodic table. The "metal/metalloid" refers to an element that absorbs and releases lithium, that can be classified as a metal and/or metalloid in the periodic table, and that is not carbon. For example, the metal/metalloid-containing negative active material may include a metal and/or metalloid element selected from the group of Al, Ga, In, Tl, Si, Ge, Sn, Pb, Sb, Bi, and a combination thereof.

For example, the metal/metalloid-containing negative active material may include at least one element selected from Si, Ge, and Sn.

According to an embodiment, the metal/metalloid-containing negative active material may be or may include a silicon alloy-based negative active material. An amount of silicon (Si) included in the silicon alloy-based negative active material may be, for example, about 40 atom % or more, about 50 atom % or more, or about 60 atom % or more. Including an amount of silicon (Si) that satisfies the above-described conditions may help provide a negative active material with high capacity.

The silicon alloy-based negative active material may be, for example, a Si—Z alloy (herein, Z is alkali metal, alkali earth-metal, a Group 11 element, a Group 12 element, a Group 13 element, a Group 14 element, a Group 15 element, a Group 16 element, transition metal, rare-earth element, or a combination thereof, and is not Si). Z of the Si—Z alloy may be selected from the group of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof.

According to an embodiment, the silicon alloy-based negative active material may include silicon (Si) and at least one metal selected from Ca, Sc, Ti, V, Cr, Mn, Fe, Co, Ni, Cu, Zn, Sr, Y, Zr, Nb, Ba, Lu, Hf, Ta, and a lanthanum element.

According to an embodiment, the silicon alloy-based negative active material may include silicon (Si) and at least two metals selected from, Ca, Sc, Ti, V, Cr, Mn, Fe, Co, Ni, Cu, Zn, Sr, Y, Zr, Nb, Ba, Lu, Hf, Ta, and a lanthanum element. The silicon alloy-based negative active material may be represented by Si-M'-M", where M' may be Al, Ti, or Fe, and M" may be Ni, Fe, or Mn. For example, the silicon alloy-based negative active material may be SiTiNi, SiFeAl, SiMnAl, SiFeTi, SiFeMn, or SiAlNi.

Herein, the stoichiometry of the respective metallic components may be appropriately controlled according to properties of a battery. The total stoichiometry of the silicon alloy-based negative active material is 100 atom %. For example, in the silicon alloy-based negative active material, Si may be included in an amount of about 40 to about 80 atom %, M' may be included in an amount of about 10 to about 30 atom %, and M" may be included in an amount of about 10 to about 30 atom %. In detail, in the silicon alloy-based negative active material, Si may be included in an amount of about 60 to about 80 atom %, M' may be included in an amount of about 10 to about 20 atom %, and M" may be included in an amount of about 10 to about 20 atom %.

Si that constitutes the silicon alloy-based negative active material may be a mixture of inactive silicon and active silicon. The active silicon may directly relate to a capacity of the silicon alloy-based negative active material, and the inactive silicon may have an inactive matrix structure and may suppress a volumetric expansion of a silicon-based alloy. The active silicon may precipitate as nano-particles in an inactive matrix and then may be dispersed. The silicon nanoparticles may be crystalline or non-crystalline.

The active silicon may be present in an amount of about 40 to about 80 atom % based on 100 atom % of the total of the active silicon and the inactive silicon in the silicon alloy-based negative active material. Maintaining the amount of the active silicon within this range may help suppress a volumetric expansion of the silicon alloy-based negative active material during charging and discharging of an electrode and a formed electrode may have excellent capacity properties.

The inactive silicon may form a matrix in an alloy form with other metal. The inactive silicon may be present in an amount of about 20 to about 60 atom % based on 100 atom % of the total of the active silicon and the inactive silicon in the silicon alloy-based negative active material. Also, in the matrix, Si may be included in an amount of about 40 to about 60 atom %, M' may be included in an amount of about 20 to about 30 atom %, and M" may be included in an amount of about 20 to about 30 atom %.

As described above, regarding a silicon alloy-based negative active material in which active silicon nanoparticles precipitate and disperse inside an inactive alloy matrix, silicon nanoparticles may expand during charging and discharging, and the silicon alloy-based matrix surrounding the silicon nanoparticles may efficiently control a volumetric change of silicon. Accordingly, such silicon-based alloys may contribute to a decrease in an expansion rate of an electrode during charging and discharging.

According to an embodiment, the silicon alloy-based negative active material may have a nano structure having one or more forms selected from a nanoparticle, a nanowire, a nanotube, a nanobelt, a nanorod, a nano porous structure, and a nanotemplate.

For example, the silicon alloy-based negative active material may be nanoparticles or powder. For example, a particle size of silicon alloy-based negative active material particles may be about 20 μm or lower. For example, a particle size of silicon alloy-based negative active material particles may be about 10 μm or lower. For example, a particle size of silicon alloy-based negative active material particles may be about 5 μm or lower. For example, a particle size of silicon alloy-based negative active material particles may be in a range of about 1 to about 10 μm, about 5 to about 10 μm, or about 1 to about 5 μm. For example, a particle size of silicon alloy-based negative active material particles may be about 500 nm or lower.

Providing silicon alloy-based negative active material particles with such particle sizes may help absorb a volumetric change of metal/metalloid associated with charging and discharging of a lithium battery.

A particle size of nanoparticles means a particle size corresponding to 50% of 100%, which indicates the number of all particles, in an accumulated particle size distribution curve in which particles are sequentially accumulated from a particle having the smallest size to a particle having the largest size. D50 may be measured, for example, using a particle size analyzer, or from TEM or SEM images. Alternatively, for example, after a measurement apparatus using dynamic light-scattering is used, data analysis is performed to count the number of particles in the respective size ranges, and from the results, D50 may be obtained.

The silicon alloy-based negative active material may be in the form of nanoparticles, and the nanoparticles may have a structure in which active silicon nanoparticles may be dispersed in an inactive silicon alloy matrix. A particle size distribution of the silicon nanoparticles dispersed in the alloy matrix may have a scattering of D10≥10 nm and D90≤75 nm. Herein, D10 and D90 may be evaluated by, respectively, measuring particle sizes corresponding to 10% and 90% from the smallest particle in the accumulated particle size distribution curve of active silicon nanoparticles in a similar manner to the above-described particle analysis method.

According to an embodiment, a particle size distribution of silicon nanoparticles may be D10≥10 nm and D90≤75 nm, and at least 60% of the particles may have a particle size in a range of 28 to 65 nm.

The negative electrode composition may further include a carbonaceous negative active material that may be used in a lithium battery in addition to the silicon alloy-based negative active material.

The carbonaceous negative active material may be crystalline carbon, amorphous carbon, or mixture thereof. The crystalline carbon may be, for example, natural graphite, artificial graphite, expansion graphite, graphene, carbon black, fullerene soot, carbon nanotube, carbon fiber, and the amorphous carbon may be soft carbon (cold calcination carbon), hard carbon, a pitch carbide, a mesophase pitch carbide, or a calcined corks. According to an embodiment, the carbonaceous negative active material may be a combination of two or more thereof.

When the negative electrode composition further include a carbonaceous negative active material, an oxidation reaction of the silicon alloy-based negative active material may be suppressed, a solid electrolyte interface (SEI) film may be effectively formed, a stable film may be formed and electric conductivity may be improved, and improvement of charging and discharging properties of lithium may be induced.

The carbonaceous negative active material may be mixed with the silicon alloy-based negative active material and the mixture may be blended. Alternatively, the carbonaceous negative active material may be coated on the surface of the silicon alloy-based negative active material. An amount of the carbonaceous negative active material may vary, but electric conductivity of the silicon alloy-based negative active material may improves while high capacity thereof may be maintained. For example, the carbonaceous negative active material may be present in an amount of about 1 to about 50 wt %, about 5 to about 40 wt %, or about 10 to about 30 wt %, based on the total weight of the silicon alloy-based negative active material and the carbonaceous negative active material.

The negative electrode composition may further include a binder to provide an adhesion force among electrode constituting materials and an adhesion force between these materials and a current collector. According to an embodiment, the negative electrode composition may include an acrylate-based binder. The acrylate-based binder may have a high adhesion force to increase adhesion properties of an active material, and may function as a buffer to reduce reactivity with an electrolyte. Side reactions, which occur during charging and discharging cycles proceed, may be suppressed, and high capacity and cycle properties improvement effects may be obtained.

According to an embodiment, the acrylate-based binder may include a polyacrylate prepared by polymerizing ethylenically unsaturated carboxylic acid ester as a monomer repeating unit.

Examples of the ethylenically unsaturated carboxylic acid ester include alkyl ester acrylate, such as methyl acrylate, ethyl acrylate, propyl acrylate, isopropyl acrylate, n-butyl acrylate, isobutyl acrylate, pentyl acrylate, dodecyl acrylate, n-amyl acrylate, isoamyl acrylate, n-hexyl acrylate, 2-ethyl hexyl acrylate, isobornyl acrylate, hydroxylpropyl acrylate, lauryl acrylate, or a substituted alkyl ester thereof; and alkyl ester methacrylate, such as methyl methacrylate, ethyl methacrylate, propyl methacrylate, isopropyl methacrylate, n-butyl methacrylate, isobutyl methacrylate, pentyl methacrylate, dodecyl methacrylate, n-amyl methacrylate, isoamyl methacrylate, n-hexyl methacrylate, 2-ethyl hexyl methacrylate, isobornyl methacrylate, hydroxylpropyl methacrylate, lauryl methacrylate, or a substituted alkyl ester thereof; isomers thereof, derivatives thereof, and combinations thereof.

The polyacrylate may include a homopolymer or a copolymer of such ethylenically unsaturated carboxylic acid ester. The polyacrylate may include a copolymer, and about 50 mol % or more, about 60 mol % or more, about 70 mol % or more, about 80 mol % or more, or about 90 mol % or more of the polyacrylate may be the ethylenically unsaturated carboxylic acid ester. The copolymer may be prepared by polymerizing ethylenically unsaturated carboxylic acid ester with other monomers that can be polymerized with the ethylenically unsaturated carboxylic acid ester.

Examples of a monomer that can be polymerized with the ethylenically unsaturated carboxylic acid ester include an unsaturated carbonic acid, such as acrylic acid, methacrylic acid, itaconic acid, or fumaric acid; a carboxylic acid ester having two or more carbon-carbon double bonds, such as diethylene glycol dimethacrylate, diethylene glycol dimethacrylate, or trimethylolpropane triacrylate; a styrene-based monomer, such as styrene, chloro styrene, vinyl toluene, t-butyl styrene, vinyl benzoate, methyl vinyl benzoate, vinyl naphthalene, chloromethyl styrene, hydroxy methyl styrene, α-methyl styrene, or divinyl benzene; an amid-based monomer, such as acrylamide, N-alkyl acrylamide, N,N-dialkyl acrylamide, N-methylol acrylamide, or acrylamide-2-methyl propane sulfonate; α,β-unsaturated nitrile compound, such as acrylonitrile, methacrylonitrile; an olefin, such as ethylene or propylene; a diene-based monomer, such as butadiene or isoprene; a halogen atom-containing monomer, such as vinyl chloride, vinylidene chloride; a vinyl ester, such as vinyl acetate, vinyl propionate, vinyl butyrate, or vinyl benzoate; a vinyl ether, such as allyl glycidyl ether, methyl vinyl ether, ethyl vinyl ether, butyl vinyl ether; a vinyl ketone, such as methyl vinyl ketone, ethyl vinyl ketone, butyl vinyl ketone, hexyl vinyl ketone, isopropenyl; and a heterocycylic-containing vinyl compound, such as N-vinyl pyrrolidone, vinyl pyridine, or vinyl imidazole.

According to an embodiment, the acrylate-based binder may include a lithium salt of polyacrylic acid (hereinafter referred to as "lithium polyacrylate") prepared by polymerization with ethylenically unsaturated carboxylic acid as a monomer repeating unit. The lithium polyacrylate may improve, compared to styrene-butadiene-rubber (SBR) and polyvinylidene fluoride (PVDF) (which may be used as a binder for an electrode), lithium ion conductivity and electrical conductivity of a negative active material, thereby providing high charging and discharging efficiency and high capacity retention ratio. Also, the lithium polyacrylate may be homogeneously coated on a surface of the silicon-based negative active material to form a stable solid electrolyte interface (SEI) layer, and accordingly, may be useful for a silicon alloy-based negative active material with a relatively large volumetric expansion.

The lithium polyacrylate may be obtained by neutralizing an acidic group of polyacrylic acid with basic lithium. Polyacrylic acid may include a polymer or copolymer obtained by polymerizing ethylenically unsaturated carboxylic acid as a monomer repeating unit. An example of the ethylenically unsaturated carboxylic acid is a monomer having one or more carboxylic acids, such as acrylic acid, methacrylic acid, itaconic acid, fumaric acid, chrotonic acid, maleic acid, anhydrous maleic acid, mesaconic acid, glutaconic acid, a derivative thereof, or a combination thereof.

Polyacrylic acid may include a homopolymer or copolymer of ethylenically unsaturated carboxylic acid, and when polyacrylate is a copolymer, about 50 mol % or more, about 60 mol % or more, about 70 mol % or more, about 80 mol % or more, or about 90 mol % or more of the copolymer may be the ethylenically unsaturated carboxylic acid. The copolymer may be obtained by polymerizing the ethylenically unsaturated carboxylic acid and other monomers that can be copolymerized with ethylenically unsaturated carboxylic acid. Those examples of a monomer that can be copolymerized with the ethylenically unsaturated carboxylic acid ester may also be used as such monomers that can be copolymerized with ethylenically unsaturated carboxylic acid.

The lithium polyacrylate may be obtained by neutralizing an acidic group of a corresponding polyacrylic acid with basic lithium. For example, a lithium hydroxide may be used to neutralize an acidic group. Also, the lithium polyacrylate may be obtained by substituting a cation, such as a sodium cation, with lithium by ion exchange. A neutralizable acidic group may include a carboxylic acid existing at an end or pendent of polyacrylic acid, and any other acidic group having a cation that is exchangeable with lithium existing in a polymer.

Lithium polyacrylate may include, for example, about 50 mol % or more, or more about 60 mol % or more, about 70 mol % or more, about 80 mol % or more, about 90 mol % or more, or about 100 mol % of a lithium cation based on a mole equivalent of an acidic group of a corresponding polyacrylic acid.

For example, lithium acrylate may be prepared by dissolving polyacrylic acid in water and an aprotic organic solvent that is miscible with water, such as tetrahydrofuran, dimethylsulfoxide, and N,N-dimethylformamide, or a mixed solvent thereof, followed by titrating with a lithium hydroxide aqueous solution to perform neutralization. About 50 mol % or more, about 60 mol % or more, about 70 mol % or more, about 80 mol % or more, about mol 90% or more, or about 100 mol % of a carboxylic acid group may be lithiated.

A weight average molecular weight (Mw) of the acrylate-based binder may be, for example, about 5000 or more, about 10000 or more, or about 100000 or more. For example, the weight average molecular weight (Mw) of the acrylate-based binder may be in a range of about 5000 to about 1250000.

An amount of the acrylate-based binder may be in a range of about 2 to about 10 wt % based on a total weight of the negative electrode composition. When the amount is smaller than the lower limit, an adhesion effect of the binder on a negative electrode plate may decrease, and when the amount is greater than the upper limit, the negative electrode plate may undergo significant curling, which may restrict commercialization. For example, the acrylate-based binder may be present in an amount of about 2 to about 8 wt %, or about 4 to about 8 wt %, based on a total weight of the negative electrode composition.

The negative electrode composition may further include guanidine carbonate as an adhesion enhancer in addition to the silicon alloy-based negative active material and the acrylate-based binder. Guanidine carbonate has the following chemical structure, and may enhance an adhesion force between a negative active material and a binder, and further a current collector.

The combination of the acrylate-based binder and guanidine carbonate may improve an adhesion force with an electrode plate, and electric conductivity of the negative electrode composition, a volumetric change of the silicon alloy-based negative active material during repeated lithiation/de-lithiation cycling may be appropriately tolerated, and lifespan properties may be improved.

Guanidine carbonate has high alkalinity. For example, when prepared in a 5% aqueous solution, the obtained solution may have a pH of about 11 to 12.

The guanidine carbonate may be present in an amount of at least 3 parts by weight based on 100 parts by weight of the acrylate binder. For example, the guanidine carbonate may be present in an amount of about 3 to about 30 parts by weight based on 100 parts by weight of the acrylate binder. When the guanidine carbonate is present in an amount of less than 3 parts by weight, an adhesion force with an electrode plate may be low, and lifespan properties of the negative electrode composition may decrease.

The remainder of the negative electrode composition, other than the acrylate-based binder, the guanidine carbonate, and the carbonaceous negative active material, which is optionally used, is the silicon alloy-based negative active material.

The negative electrode composition may include a solvent or may not include a solvent. When the negative electrode composition does not include a solvent, the negative electrode composition itself is a composition constituting a negative electrode plate. When the negative electrode composition includes a solvent, the negative electrode composition may be a slurry for forming a negative electrode plate, and the slurry may be coated on a current collector and then heated to remove a solvent therefrom by evaporation, thereby obtaining a solvent-free negative electrode plate.

A negative electrode according to an embodiment includes the negative electrode composition.

The negative electrode may be manufactured as follows: for example, the negative electrode composition and optionally a conductive agent are mixed in a solvent to prepare slurry for forming a negative electrode, and then, the slurry is formed in a predetermined shape, or coated on a current collector, such as a copper foil.

In detail, the negative electrode composition, optionally a conductive agent, and a solvent are mixed to prepare a slurry for forming a negative electrode. The slurry is directly coated on a metal current collector to prepare a negative electrode plate. According to another embodiment, the slurry is cast on a separate support, and then, a film exfoliated from the support is laminated on a metal current collector to manufacture a negative electrode. The negative electrode may also be manufactured by using other methods.

The slurry may further include optionally a conductive agent to provide a conductive passage to a negative active material to further improve electric conductivity. The conductive agent may be, for example, a carbonaceous material, such as carbon black, acetylene black, ketjen black, carbon fiber (for example, vapor growth carbon fiber); a metallic material, such as copper, nickel, aluminum, or silver in the form of powder or fiber; a conductive polymer, such as a polyphenylene derivative; or a combination thereof. The conductive agent may be any one of various other conductive agents that may be used as a conductive agent in a lithium battery.

The slurry for forming a negative electrode may further include, in addition to the acrylate-based binder, another binder. Examples of the other binder include polyvinylidenefluoride, polyvinylidenefchloride, polybenzimidazole, polyimide, polyvinylacetate, polyacrylonitrile, polyvinylalcohol, carboxymethylcellulose (CMC), starch, hydroxypropyl cellulose, regenerated cellulose, polyvinylpyrrolidone, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene ter polymer (EPDM), sulfonated EPDM, styrene butadiene rubber, fluoro rubber, and various copolymers. A binder for use herein may be any one of various materials that can be used as a binder in the art.

As the solvent, for example, N-methylpyrrolidone, acetone, or water may be used. The solvent may be any one of various suitable materials.

Amounts of the electrode composition, the conductive agent, the binder, and the solvent may be at the same levels as used in a general lithium battery. According to the purpose and structure of a lithium battery, one or more of the conductive agent, the binding agent, the binder, and the solvent may not be used.

The current collector may be formed in a thickness of, for example, about 3 to about 500 μm. The current collector should not cause any chemical change in a formed battery and should be conductive. Examples of a material for forming the current collector include copper, stainless steel, aluminum, nickel, titanium, calcined carbon, copper or stainless steel that is surface treated with carbon, nickel, titanium, or silver, and an aluminum-cadmium alloy. In addition, the current collect may have a fine uneven structure to increase a binding force with respect to a negative active material, and the current collector may have various shapes, such as film, sheet, foil, net, porosity, foam, or non-woven shape.

A lithium battery according to an embodiment includes the negative electrode. The lithium battery may be manufactured in the following manner.

First, a negative electrode is manufactured by using the method of manufacturing a negative electrode described above.

Then, a positive active material, a conductive agent, a binder, and a solvent are mixed to prepare a slurry for forming a positive electrode. Then, a positive active material, a conductive agent, a binder, and a solvent are mixed to prepare a slurry for forming a positive electrode. According to another embodiment, the slurry may be cast on a separate support, and then a film exfoliated from the support is laminated on a metal current collector, thereby completing the manufacturing a positive electrode plate.

The positive active material may include one or more selected from the group of lithium cobalt oxide, lithium nickel cobalt manganese oxide, lithium nickel cobalt aluminum oxide, lithium iron phosphate, and lithium manganese oxide. The positive active material may be any one of various other positive active materials in the art.

For example, a compound represented by any one of the following formulae may be used: $Li_aA_{1-b}B_bD_2$ (wherein $0.90 \leq a \leq 1.8$, and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (wherein $0.90 \leq a \leq 1.8$, and $0.001 \leq b \leq 0.1$.); $Li_aCoG_bO_2$ (wherein $0.90 \leq a \leq 1.8$, and $0.001 \leq b \leq 0.1$.); $Li_aMnG_bO_2$ (wherein $0.90 \leq a \leq 1.8$, and $0.001 \leq b \leq 0.1$.); $Li_aMn_2G_bO_4$ (wherein $0.90 \leq a \leq 1.8$, and $0.001 \leq b \leq 0.1$.); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

These compounds may have a coating layer on their surfaces, or these compounds may be mixed with a compound having a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed by using any one of various coating methods that are performed using the compounds and the elements and do not affect properties of the positive active material (for example, spray coating or immersion). These coating methods may be suitably determined.

For example, $LiCoO_2$, $LiNiO$, $LiMnO_2$, $LiMn_2O_4$, $Li(Ni_aCo_bMn_c)O_2 (0<a<1, 0<b<1, 0<c<1, a+b+c=1)$, $LiNi_{1-y}Co_yO_2(0 \leq y<1)$, $LiCo_{1-y}Mn_yO_2(0 \leq y<1)$, $LiNi_{1-y}Mn_yO_2(0 \leq y<1)$, $LiMn_{2-z}Ni_zO_4(0<z<2)$, $LiMn_{2-z}Co_zO_4 (0<z<2)$, $LiFeO_2$, $V_2O_5$, $TiS$, or $MoS$ may be used.

The conductive agent, the binder, and the solvent included in the slurry for forming a positive electrode may be the same as included in the slurry for forming the negative electrode. Also, the slurry for forming a positive electrode and/or the slurry for forming a negative electrode may further include a plasticizer to form pores in an electrode plate.

Amounts of the positive active material, the conductive agent, the binder, and the solvent may be at the same levels as used in a general lithium battery. According to the purpose and structure of a lithium battery, one or more of the conductive material, the binding agent, and the solvent may not be used.

A separator that is to be inserted between the positive electrode and the negative electrode may be prepared. The separator may be formed of any one of various materials that may be used in a lithium battery. A material for forming the separator may be a material that has low resistance to ion migration of an electrolyte and has excellent electrolytic solution retaining capability. The separator forming material may be selected from glass fiber, polyester, Teflon, polyethylene, polypropylene, polytetrafluoroethylene (PTFE), and a combination thereof, each of which may be in a non-woven fabric or woven fabric form. For example, for use in a lithium ion battery, a rollable separator formed of polyethylene or polypropylene may be used, and for use in a lithium ion polymer battery, a separator that has excellent organic electrolytic solution-retaining capability may be used. For example, the separator may be prepared by using the following method.

A separator composition may be prepared by mixing a polymer resin, a filler, and a solvent. The separator composition may be directly coated or dried on an electrode to complete the formation of the separator. According to another embodiment, the separator composition may be cast on a separate support and then a film separated from the support may be laminated on an electrode, thereby completing the formation of the separator.

A polymer resin used in preparing the separator may be any material that may be used for a binder of an electrode plate. For example, a vinylidene fluoride/hexafluoropropylene copolymer, polyvinylidenefluoride (PVDF), polyacrylonitrile, polymethylmethacrylate, or a mixture thereof may be used.

Then, an electrolyte may be prepared.

The electrolyte may include a non-aqueous electrolyte and a lithium salt. The non-aqueous electrolyte is a non-aqueous electrolytic solution, an organic solid electrolyte, or an inorganic solid electrolyte.

An example of the non-aqueous electrolytic solution is an aprotic solvent, and examples of the aprotic solvent as the non-aqueous electrolytic solution are N-methyl-2-pyrrolidinone, propylene carbonate, ethylene carbonate, butylene carbonate, dimethyl carbonate, diethyl carbonate, gamma-butylo lacton, 1,2-dimethoxy ethane, tetrahydroxy franc, 2-methyl tetrahydrofurane, dimethylsulfoxide, 1,3-dioxoran, 4-methyldioxoran, formamide, N,N-dimethylformamide, acetonitril, nitromethane, methyl formate, methyl acetate, triester phosphate, trimethoxy methane, dioxorun derivative, sulforane, methyl sulforane, 1,3-dimethyl-2-imidazolidinone, propylene carbonate derivative, tetrahydrofurane derivative, ether, methyl propionate, and ethyl propionate.

Examples of the organic solid electrolyte are a polyethylene derivative, a polyethylene oxide derivative, a polypropylene oxide derivative, a phosphate ester polymer, polyester sulfide, polyvinyl alcohol, poly fluoro vinylidene, and a polymer containing ionic dissociation groups.

Examples of the inorganic solid electrolyte are nitrides, halids, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any one of various materials that are generally used in a lithium battery, for example, a material that may be easily dissolved in the non-aqueous based electrolyte may be used. Examples of such a material include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, low aliphatic lithium carbonate, 4 phenyl lithium borate, lithium imide, and a combination thereof.

The lithium battery according to an embodiment may be a lithium ion battery, a lithium ion polymer battery, and a lithium polymer battery, which is classified according to a separator and an electrolyte, and may also be a cylindrical battery, a rectangular battery, a coin-shape battery, and a pouch-shape battery, which is classified according to the shape of a battery, and may also be a bulky battery and a thin film type battery, which is classified according to the size of a battery. In addition, the lithium battery may also be a lithium primary battery and a lithium secondary battery.

Methods of manufacturing these batteries may be suitably determined.

Figure 1:
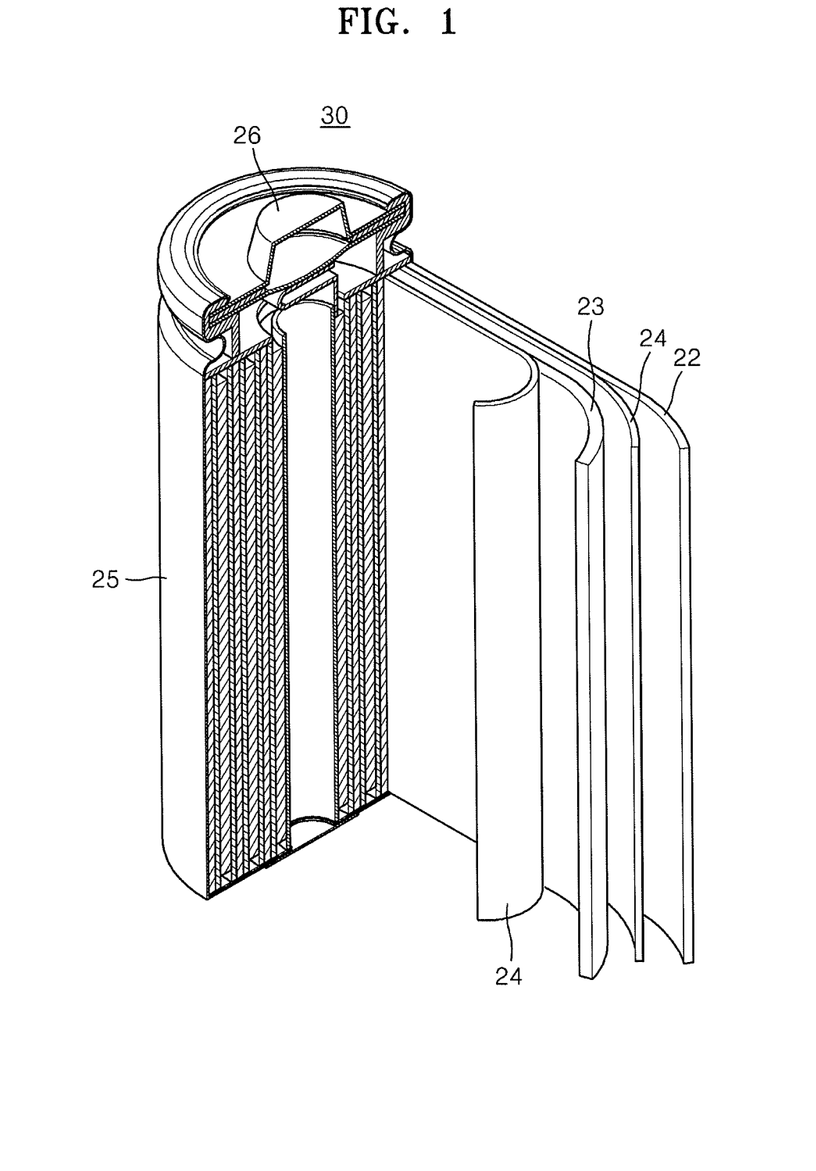
FIG. 1 illustrates a schematic view of a lithium battery according to an embodiment.
Figure 2:
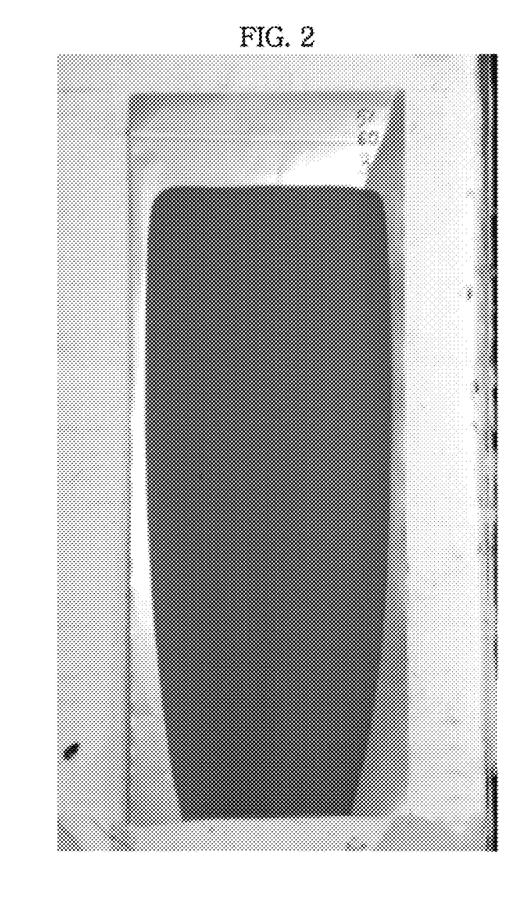
FIGS. 2 through 5 illustrate pictures of negative electrodes manufactured according to Examples 1 through 4, showing curling of electrode plates of the negative electrodes, respectively.
Figure 3:
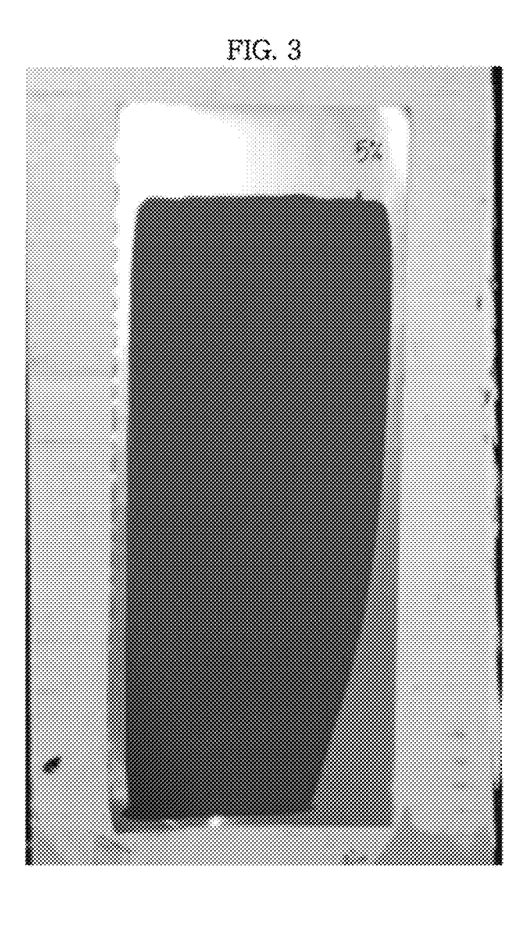
Figure 4:
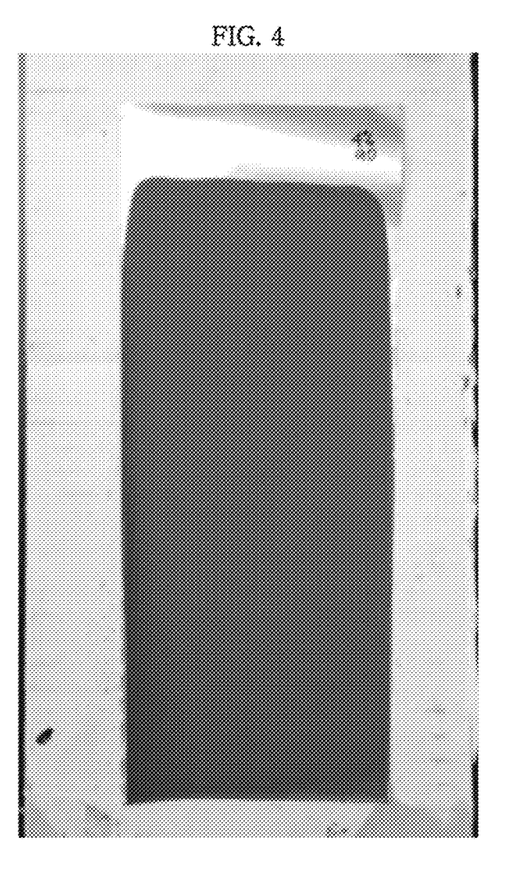
Figure 5:
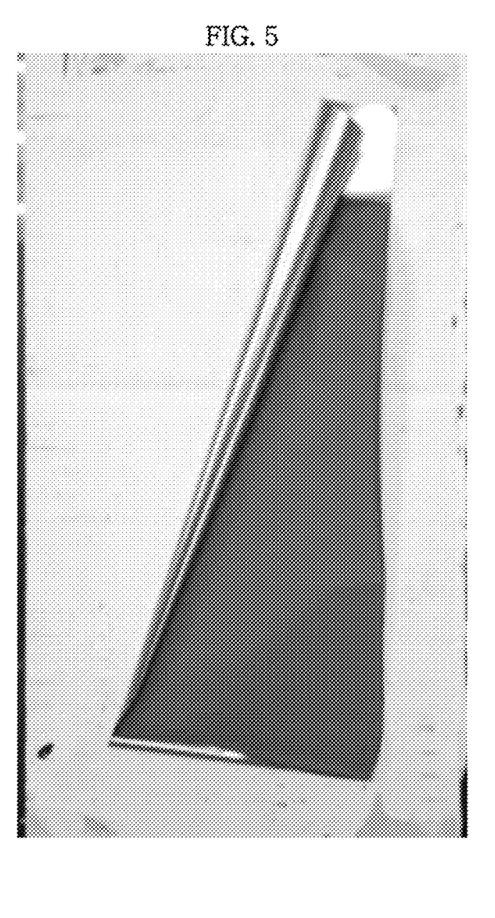

FIG. 1 illustrates a schematic view of a secondary lithium battery 30 according to an embodiment.

Referring to FIG. 1, the secondary lithium battery 30 mainly includes a positive electrode 23, a negative electrode 22 and a separator 24 interposed between the positive electrode 23 and the negative electrode 22. The positive electrode 23, the negative electrode 22, and the separator 24 are wound or folded to be placed in a battery case 25. Subsequently, an electrolyte is supplied into the battery case 25 and the resultant structure is sealed with a sealing member 26, thereby completing the manufacturing of the lithium battery 30. The battery case 25 may be a cylindrical, rectangular, or thin-film shape. The lithium battery may be a lithium ion battery.

The lithium battery may be suitable for, in addition to mobile phones and portable computers, applications requiring high capacity, high performance, and high-temperature driving, such as electric vehicles. In addition, the lithium battery may be combined with an internal combustion engine, a fuel battery, or a super capacitor for use in hybrid vehicles. For example, excellent high-rate properties and lifespan properties may make the lithium battery suitable for use in an electric vehicle (EV), for example, a hybrid car, such as a plug-in hybrid electric vehicle (PHEV).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Coin half cells were manufactured according to Examples 1 through 4 to identify effects of lithium polyacrylate according to an amount thereof.

Example 1

A negative electrode including Si alloy, SFG6, ketjen black, and lithium polyacrylate (LiPAA) at a weight ratio of 86:10:2:2 and 10 parts by weight of guanidine carbonate based on 100 parts by weight of LiPAA was manufactured as follows:

First, to prepare LiPAA, $LiOH.H_2O$ (Sigma-Aldrich) was added in small amounts to a 5 wt % polyacrylic acid aqueous solution, and a pH of the resultant solution was adjusted to be 8, and the mixture was stirred for 48 hours or more to obtain a homogeneous mixed solution. The obtained mixed solution was placed in a dish, and dried at a temperature of 110° C. in a drying furnace for 2 hours to perform evaporation to obtain lithium polyacrylate (LiPAA) solid powder.

Subsequently, distilled water was added to a mixed powder of 86 wt % of Si alloy (3M Company, America) and 2 wt % of ketjen black until a solid content reached 60 wt %, and then the mixture was stirred for 5 minutes. Thereafter, 2 wt % of LiPAA and 10 parts by weight of guanidine carbonate based on 100 parts by weight of LiPAA were added thereto and the resultant mixture was stirred for 15 minutes. Then, 10 wt % of SFG6 was added as a lubricative graphite inducing the suppression of expansion and the mixture was stirred for 10 minutes, thereby completing the preparation of a negative electrode slurry. The negative electrode slurry was coated on a copper current collector having a thickness of 10 μm and vacuum-dried at a temperature of 120° C. for 2 hours to complete the manufacturing of a negative electrode. The negative electrode had L/L of 4.4 to 4.5 mg/cm$^2$ and an assembly density of 1.3 to 1.5 g/cc.

A 2032-type coin half cell was manufactured by using Li metal as a counter electrode and a polyethylene separator (STAR 20, Asahi) as a separator which were compressed after supply of an electrolytic solution. The electrolytic solution was 1.5M LiPF$_6$ dissolved in a mixed solvent of ethylenecarbonate (EC):diethylcarbonate (DEC):fluoroethylenecarbonate (FEC) (a volumetric ratio of 5:70:25).

Example 2

A coin half cell was manufactured in the same manner as in Example 1, except that Si alloy, SFG6, ketjen black, and LiPAA were mixed at a weight ratio of 84:10:2:4.

Example 3

A coin half cell was manufactured in the same manner as in Example 1, except that Si alloy, SFG6, ketjen black, and LiPAA were mixed at a weight ratio of 80:10:2:8.

Example 4

A coin half cell was manufactured in the same manner as in Example 1, except that Si alloy, SFG6, ketjen black, and LiPAA were mixed at a weight ratio of 78:10:2:10.

Evaluation Example 1: Identification of Curling of Electrode Plate

The negative electrode slurry prepared according to Examples 1 through 4 was coated on a copper current collector having a thickness of 10 μm, and then, dried at a temperature of 110° C. for 15 to 30 minutes and curling of an electrode plate was identified. The images of the curling are shown in FIGS. 2 through 5. In each of Examples 1-4, the negative electrode slurry included 10 parts by weight of guanidine carbonate based on 100 parts by weight of LiPAA.

As shown in FIGS. 2 through 5, LiPAA hardened after drying, and when 10% guanidine carbonate based on 100 parts by weight of LiPAA was added thereto and an amount of the binder was in a range of 2 wt % to 8 wt % of the composition, curling did not occur. When an amount of LiPAA was 10 wt % of the composition, an electrode plate curled. However, the curling extent was considered to be in an acceptable range. When the amount of LiPAA exceeded 10 wt %, an electrode plate was curled too much, and thus, an electrode plate may be bent when in a process therefor.

Evaluation Example 2: Lifespan Properties Evaluation

The coin half cells of Examples 1 through 4 were repeatedly charged and discharged at 0.1 C/0.1 C once, 0.2 C/0.2 C once, 1.0 C/1.0 C 50 times, and cyclic properties were analyzed. Charging/discharging conditions used herein were constant current-constant voltage (CC-CV) (0.01 C cut-off) and constant voltage (CV) (1.5 V cut-off).

The capacity retention ratio (CRR) is defined as Equation 1 below. CRRs of the coin half cells of Example 1 through 4 are shown in FIG. 6.

Capacity retention ratio [%]=[discharge capacity at each cycle/discharge capacity in a first cycle]×100     <Equation 1>

Figure 6:
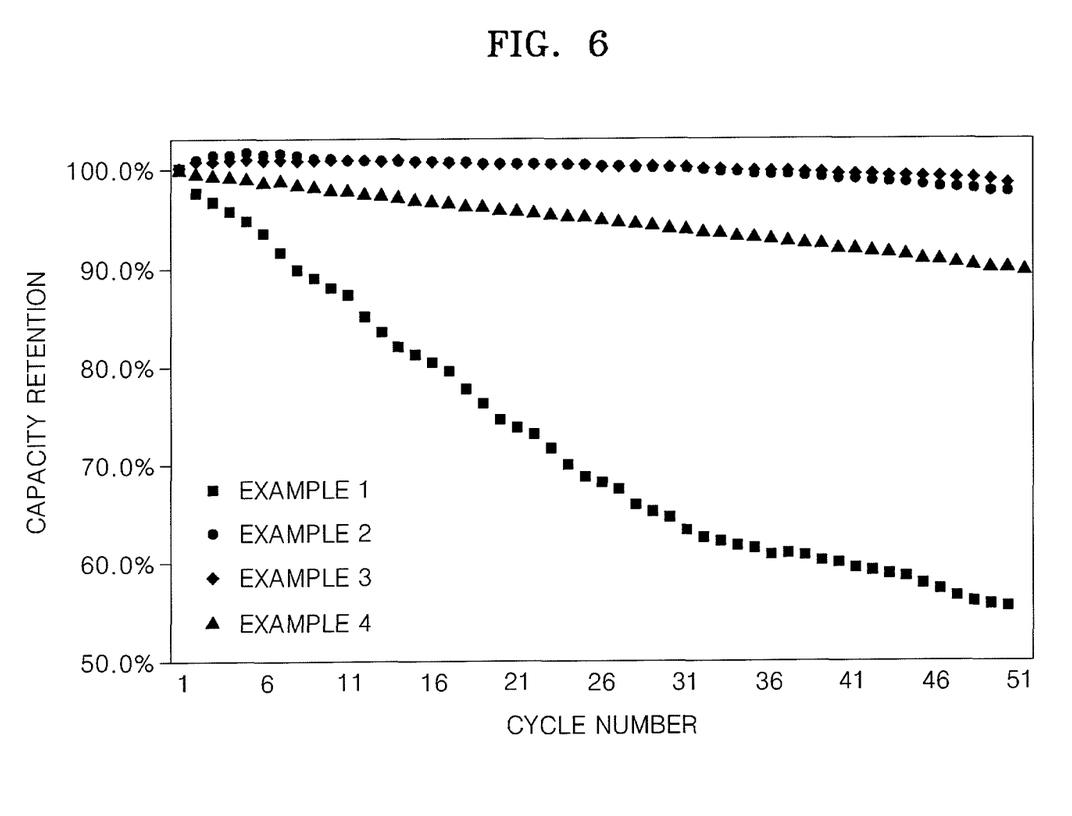
FIG. 6 illustrates a graph showing evaluation results of lifespan properties of coin half cells manufactured according to Examples 1 through 4.

Referring to FIG. 6, it was confirmed that LiPAA contributed to an increase in lifespan properties. When an amount of LiPAA was 2 wt %, better lifespan properties were obtained than when amounts of LiPAA were 4 wt %, 8 wt %, and 10 wt %, and lifespan properties were optimized.

Then, to identify effects of guanidine carbonate according to an amount of guanidine carbonate with respect to the optimized amount of lithium polyacrylate, coin half cells were manufactured according to Examples 5 through 9.

Example 5

A coin half cell was manufactured in the same manner as in Example 1, except that a Si alloy, SFG6, ketjen black, and LiPAA were mixed at a weight ratio of 84:10:2:4, and guanidine carbonate was added in an amount of 3 parts by weight based on 100 parts by weight of LiPAA.

Example 6

A coin half cell was manufactured in the same manner as in Example 5, except that guanidine carbonate was added in an amount of 5 parts by weight based on 100 parts by weight of LiPAA.

Example 7

A coin half cell was manufactured in the same manner as in Example 5, except that guanidine carbonate was added in an amount of 10 parts by weight based on 100 parts by weight of LiPAA.

Example 8

A coin half cell was manufactured in the same manner as in Example 5, except that guanidine carbonate was added in an amount of 20 parts by weight based on 100 parts by weight of LiPAA.

Example 9

A coin half cell was manufactured in the same manner as in Example 5, except that guanidine carbonate was added in an amount of 30 parts by weight based on 100 parts by weight of LiPAA.

Comparative Example 1

A coin half cell was manufactured in the same manner as in Example 5, except that guanidine carbonate was not added.

Evaluation Example 3: Adhesion Properties Evaluation

Figure 7:
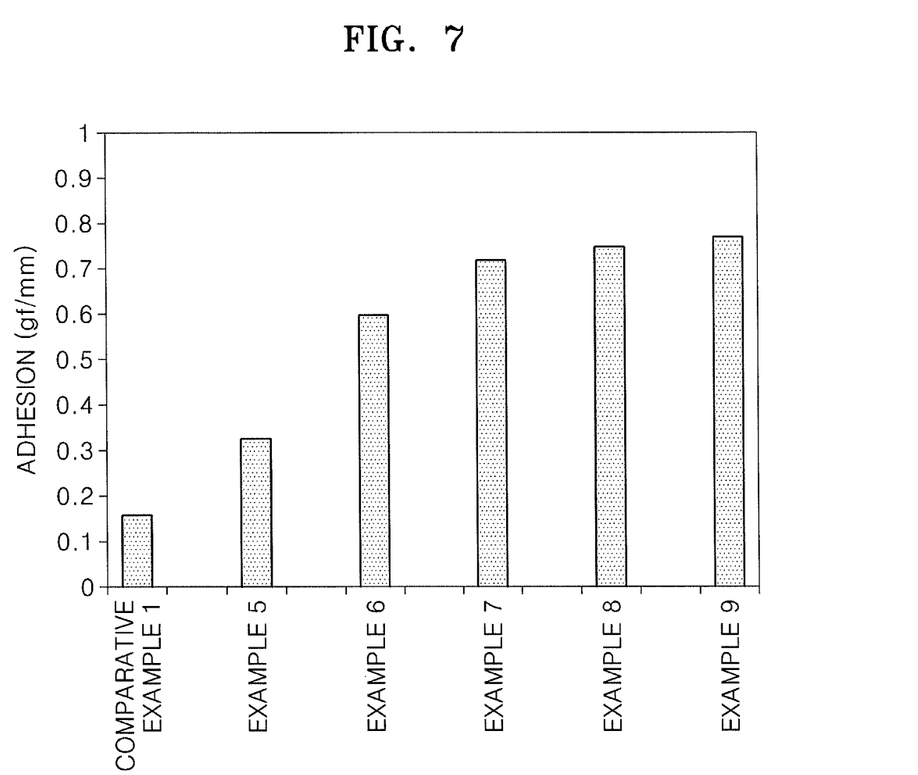
FIG. 7 illustrates a graph showing evaluation results of adhesion properties of negative electrodes manufactured according to Comparative Example 1, and 5 through 9.

An adhesion force of the negative electrodes manufactured according to Comparative Examples 1 and Examples 5 through 9 was evaluated, and results thereof are shown in Table 1 and FIG. 7.

Adhesion force was evaluated as follows: a negative electrode was cut to a length of 100 mm and a width of 1 inch, and the negative electrode plate was fixed on a glass substrate by using a double-sided adhesive tape, and then, while the negative electrode plate was separated from the glass substrate at a constant speed, a force applied for the separation was measured. An average adhesion force value was recorded in a unit of gf/mm.

TABLE 1

|  | Adhesion force [gf/mm] |
|---|---|
| Comparative Example 1 | 0.16 |
| Example 5 | 0.33 |
| Example 6 | 0.60 |
| Example 7 | 0.72 |
| Example 8 | 0.75 |
| Example 9 | 0.77 |

As shown in Table 1 and FIG. 7, an adhesion force substantially increases according to guanidine carbonate.

Evaluation Example 4: Lifespan Properties Evaluation

Figure 8:
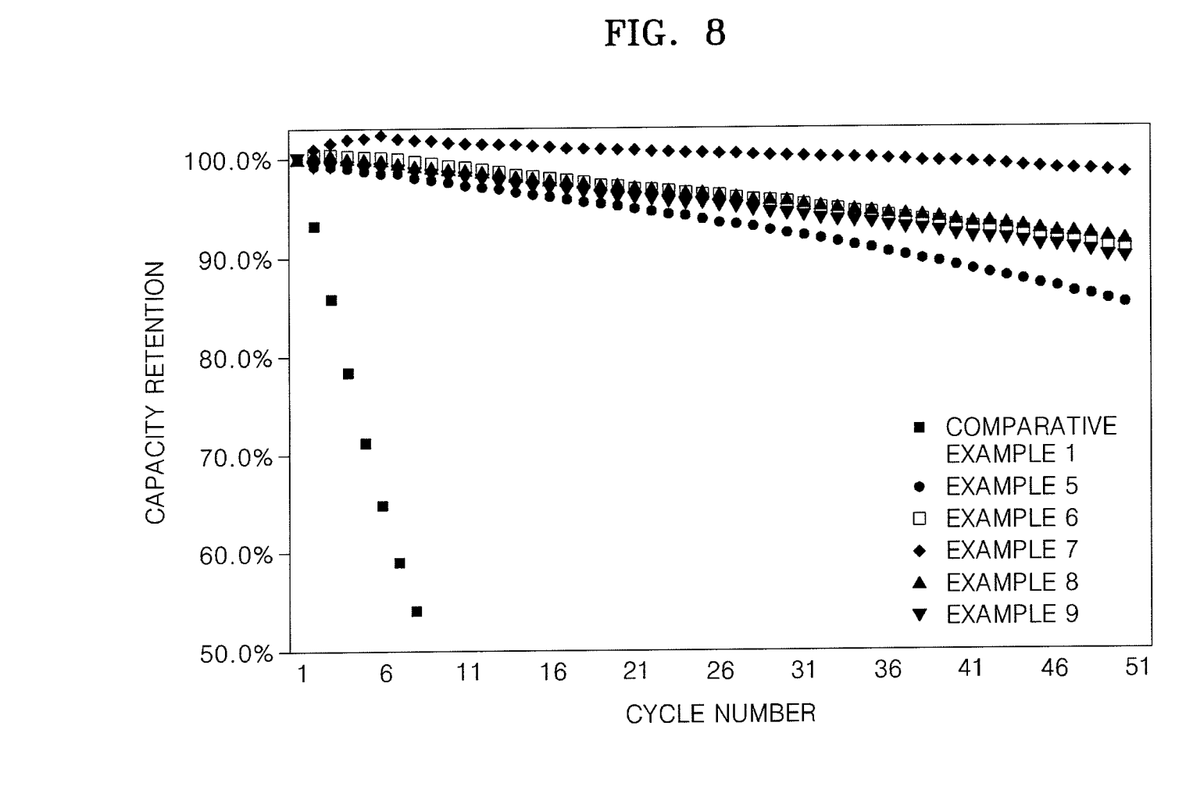
FIG. 8 illustrates a graph showing evaluation results of lifespan properties of coin half cells manufactured according to Comparative Example 1 and Examples 5 through 9.

Lifespan properties of the coin half cells manufactured according to Comparative Examples 1 and Example 5 through 9 were evaluated as in Evaluation Example 2, and results thereof are shown in FIG. 8.

Referring to FIG. 8, lifespan properties were substantially improved according to guanidine carbonate.

The inclusion of a negative electrode composition including a metal/metalloid-containing negative active material, an acrylate-based binder, and guanidine carbonate in a negative electrode of a lithium battery, may help improve lifespan properties of the lithium battery.

By way of summation and review, carbonaceous materials may have a porous structure and, during charging and discharging, may undergo less volumetric change. However, a battery using such carbonaceous materials may have a small capacity. For example, certain graphite forms having high crystallinity may theoretically have a capacity of 372 mAh/g.

A metal that is alloyable with lithium may be used as a negative active material having higher electric capacitance than the carbonaceous materials. For example, metals that are alloyable with lithium include Si, Sn, and Al. However, metal that is alloyable with lithium may easily deteriorate and its lifespan properties may be poor. For example, Si particles may be repeatedly aggregated and crushed when charging and discharging are repeatedly performed and Si particles may be electrically insulated.

For use as a lithium battery binder, polyimide and polyamide may be used as a binder that suppresses the swelling of an electrode. However, in the case of a lithium polymer battery that requires a pressing process to harden an electrode after rolling the electrode, an electrode may crack, and commercializing a lithium polymer battery including the electrode may be difficult.

For use as a lithium battery binder in a negative electrode, diene-based copolymers may be used. Diene-based copolymer binders may have high flexibility but rigidity thereof when immersed in an electrolytic solution may be low. Accordingly, when a non-carbonaceous high capacity negative active material that is alloyable with lithium, such as Si or Sn, is used, it may be difficult to suppress the swelling of an electrode.

Accordingly, there is a need for a binder that improves lifespan properties of a lithium battery by tolerating and/or suppressing a volumetric change of such non-carbonaceous negative active materials.

As described above, research into a binder system, in addition to an active material with high capacity, is actively performed to improve electrochemical performances of a lithium battery.

One or more embodiments include a negative electrode composition that may improve electrochemical performance of a lithium battery.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composition for a negative electrode, the composition comprising:
   a negative active material that contains one or more of a metal or a metalloid,
   an acrylate-based binder, and
   guanidine carbonate, wherein:
   the guanidine carbonate is present in an amount of about 3 to about 30 parts by weight based on 100 parts by weight of the acrylate-based binder, provided that the amount of guanidine carbonate is less than 1 wt % of the composition exclusive of solvent.

2. The composition as claimed in claim 1, wherein the acrylate-based binder includes lithium polyacrylate.

3. The composition as claimed in claim 2, wherein:
   the lithium polyacrylate is a lithium salt of polyacrylic acid that includes an ethylenically unsaturated carboxylic acid as a monomer repeating unit, and
   the ethylenically unsaturated carboxylic acid is acrylic acid, methacrylic acid, itaconic acid, fumaric acid, chrotonic acid, maleic acid, maleic anhydride, mesaconic acid, glutaconic acid, a derivative thereof, or a combination thereof.

4. The composition as claimed in claim 1, wherein the acrylate-based binder is present in an amount of about 2 to about 10 wt % based on a total weight of the composition.

5. The composition as claimed in claim 1, wherein the acrylate-based binder is present in an amount of about 4 to about 8 wt % based on a total weight of the composition.

6. The composition as claimed in claim 1, wherein the negative active material includes at least one metal or metalloid element selected from a Group 13 element, a Group 14 element, and a Group 15 element.

7. The composition as claimed in claim 1, wherein the negative active material includes at least one metal or metalloid element selected from Si, Ge, and Sn.

8. The composition as claimed in claim 1, wherein the negative active material includes a Si—Z alloy, wherein Z is an alkali metal, an alkali earth-metal, a Group 11 element, a Group 12 element, a Group 13 element, a Group 14 element, a Group 15 element, a Group 16 element, a transition metal, a rare-earth element, or a combination thereof, with the proviso that Z is not Si.

9. The composition as claimed in claim 8, wherein the Z is selected from Ca, Sc, Ti, V, Cr, Mn, Fe, Co, Ni, Cu, Zn, Sr, Y, Zr, Nb, Ba, Lu, Hf, Ta, a lanthanum element, or a combination thereof.

10. The composition as claimed in claim 8, wherein the Si—Z alloy is represented by Si-M'-M", wherein M' is Al, Ti, or Fe, and M" is Ni, Fe, or Mn.

11. The composition as claimed in claim 1, wherein the negative active material is in at least one form selected from a nanoparticle, a nanowire, a nanotube, a nanobelt, a nanorod, a nano porous structure and a nanotemplate.

12. The composition as claimed in claim 1, wherein the negative active material is in a form of a nanoparticle.

13. The composition as claimed in claim 1, wherein the composition further includes a carbonaceous negative active material.

14. The composition as claimed in claim 13, wherein the carbonaceous negative active material is blended with the negative active material by mixing, or the carbonaceous negative active material is coated on a surface of the negative active material.

15. A negative electrode, comprising the composition as claimed in claim 1.

16. A lithium battery, comprising the negative electrode as claimed in claim 15.

* * * * *